US012585739B2

(12) United States Patent (10) Patent No.: US 12,585,739 B2
Urakawa (45) Date of Patent: Mar. 24, 2026

(54) IMAGE FORMING DEVICE TRANSMITTING DATA FOR DISPLAYING AUTHENTICATION CHANGING WEB PAGE

(71) Applicant: BROTHER KOGYO KABUSHIKI KAISHA, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 184 days.

(21) Appl. No.: 18/310,610

(22) Filed: May 2, 2023

(65) Prior Publication Data

US 2023/0385388 A1 Nov. 30, 2023

(30) Foreign Application Priority Data

May 30, 2022 (JP) ................................. 2022-087374

(51) Int. Cl.
    *G06F 21/31* (2013.01)
    *G06F 21/64* (2013.01)
    *H04L 67/02* (2022.01)
(52) U.S. Cl.
    CPC .............. *G06F 21/31* (2013.01); *G06F 21/64* (2013.01); *H04L 67/02* (2013.01); *G06F 2221/2119* (2013.01)
(58) Field of Classification Search
    CPC .. G06F 21/31; G06F 21/64; G06F 2221/2119; H04L 67/02; H04N 1/00244; H04N 1/00464; H04N 1/00477; H04N 1/32651

USPC .............................................................. 726/3
See application file for complete search history.

(56) References Cited

U.S. PATENT DOCUMENTS

| | | | |
|---|---|---|---|
| 10,466,943 B2 * | 11/2019 | Liu ........................ | G06F 3/1288 |
| 10,594,486 B1 * | 3/2020 | Trachtman ............ | H04L 9/3226 |
| 2009/0091782 A1 * | 4/2009 | Okamoto .............. | G06F 21/554 |
| | | | 358/1.15 |
| 2012/0131653 A1 * | 5/2012 | Pasquero ............ | H04L 63/0492 |
| | | | 726/6 |

(Continued)

FOREIGN PATENT DOCUMENTS

JP 2016-100634 A 5/2016

*Primary Examiner* — James N Fiorillo
(74) *Attorney, Agent, or Firm* — Scully, Scott, Murphy & Presser, P.C.

(57) ABSTRACT

The image forming device determines, on the basis of inputted authentication information and current authentication information, whether to permit use of the web server. In a case that the use of the web server has been permitted and the current authentication information has not matched an initial authentication information, the image forming device transmits, as a web server, data for displaying a web page. In a case that the use of the web server has been permitted and the current authentication information has matched the initial authentication information, the image forming device transmits data for displaying an authentication changing web page. The authentication changing web page is for receiving new authentication information to issue a second instruction. In response to receiving the second instruction, the device updates the current authentication information in the memory using the new authentication information according to the second instruction.

20 Claims, 11 Drawing Sheets

(56)  References Cited

U.S. PATENT DOCUMENTS

| | | | | |
|---|---|---|---|---|
| 2016/0142567 | A1* | 5/2016 | Ohno | H04N 1/00244 |
| | | | | 358/1.15 |
| 2016/0300054 | A1* | 10/2016 | Turgeman | G06F 21/36 |
| 2018/0115427 | A1* | 4/2018 | Dequen | H04L 9/3242 |
| 2019/0268490 | A1* | 8/2019 | Sato | G06F 21/6218 |
| 2019/0340410 | A1* | 11/2019 | Uchida | G06V 40/1347 |
| 2020/0076798 | A1* | 3/2020 | Lidsky | H04L 9/3228 |
| 2021/0068179 | A1* | 3/2021 | Takeuchi | G06F 3/1292 |
| 2021/0160072 | A1* | 5/2021 | Heldman | H04L 9/3247 |
| 2022/0029962 | A1* | 1/2022 | Teo | H04L 63/0263 |
| 2022/0147600 | A1* | 5/2022 | Funayama | G06F 21/35 |
| 2022/0171843 | A1* | 6/2022 | Yanagi | G06F 21/31 |
| 2022/0174055 | A1* | 6/2022 | Yanagi | H04L 63/123 |
| 2022/0197991 | A1* | 6/2022 | Lee | G06F 21/46 |
| 2023/0008404 | A1* | 1/2023 | Celiesius | H04L 9/40 |
| 2023/0093667 | A1* | 3/2023 | Lee | H04L 67/02 |
| | | | | 726/8 |
| 2023/0315873 | A1* | 10/2023 | Ohkubo | G06F 21/31 |
| | | | | 726/28 |

* cited by examiner

IMAGE FORMING DEVICE TRANSMITTING DATA FOR DISPLAYING AUTHENTICATION CHANGING WEB PAGE

REFERENCE TO RELATED APPLICATIONS

This application claims priority from Japanese Patent Application No. 2022-087374 filed on May 30, 2022. The entire content of the priority application is incorporated herein by reference.

BACKGROUND ART

An image forming device with a built-in web server is known in the art. Such an image forming device can communicate with a terminal having a web browser without the need for any special application.

DESCRIPTION

However, there is room for improvement in the conventional image forming devices with a built-in web server with respect to security in communications with terminals. In particular, the initial password used to gain access to the image forming device can be easily discovered. Therefore, consideration must be given to the potential for an undesirable third party accessing the device using the initial password.

In view of the foregoing, it is an object of the present disclosure to improve the security of an image forming device with a built-in web server for communications with terminals.

In order to attain the above and other object, the present disclosure provides an image forming device. The image forming device includes a memory, a communication interface, and a computer. The computer is configured to receive authentication information inputted to the terminal, and determine, on the basis of the inputted authentication information and current authentication information, whether to permit use of the web server. The current authentication information is settable to one of initial authentication information and authentication information different from the initial authentication information. The computer is configured to, in a case that the use of the web server has been permitted and the current authentication information has matched the initial authentication information, transmit, to the terminal, data for displaying an authentication changing web page, the authentication changing web page being for receiving new authentication information. The computer is configured to update the current authentication information in the memory using the new authentication information.

In the above structure, the security of an image forming device, which has a built-in web server for communications with terminals, can be improved.

EMBODIMENT

Figure 1:
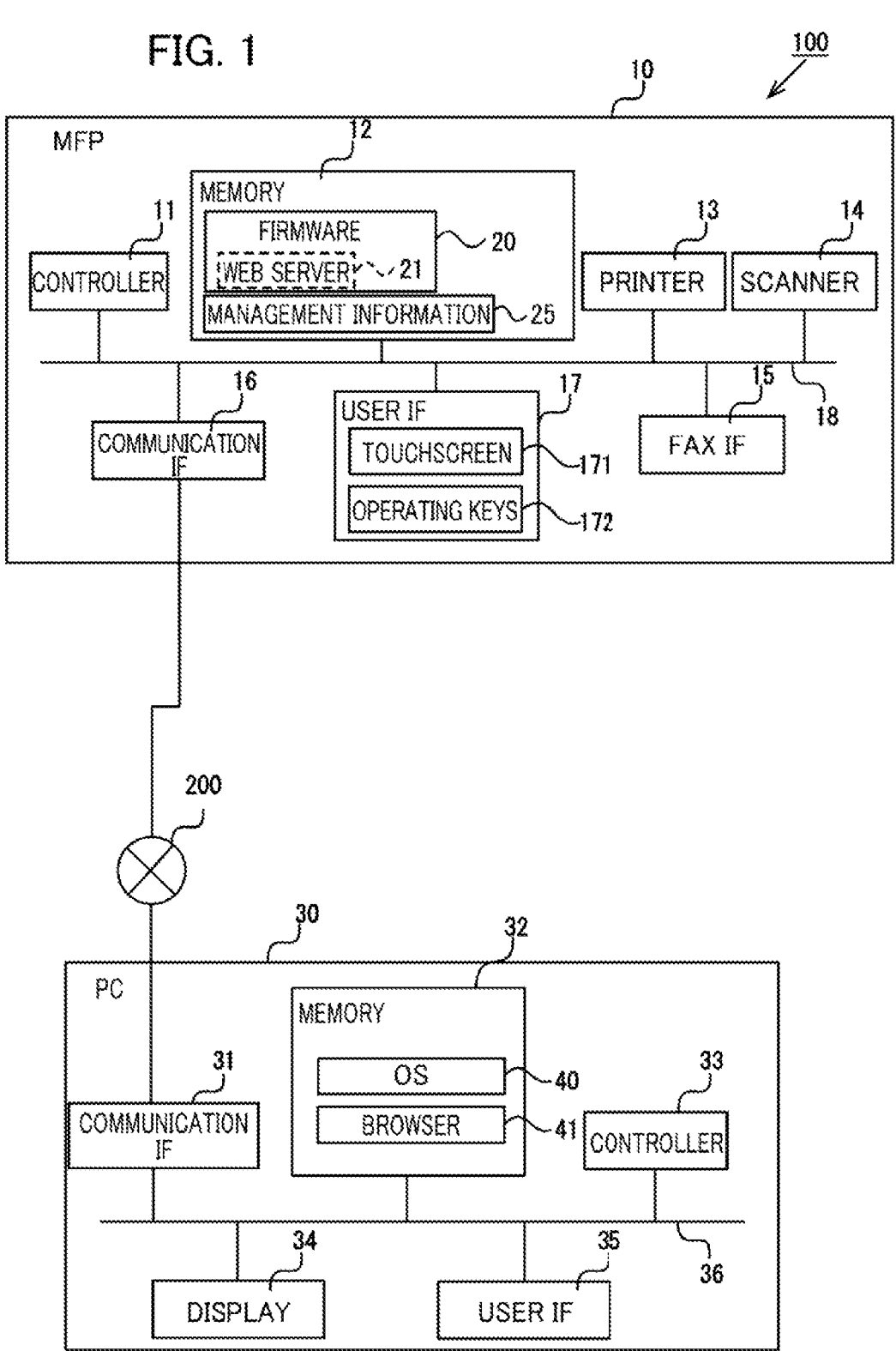
FIG. 1 is a block diagram of an image forming system.

An image formation system 100 according to an embodiment of the present disclosure will be described while referring to the accompanying drawings. The image formation system 100 shown in FIG. 1 is provided with a multifunction peripheral (MFP) 10, and a personal computer (PC) 30. The MFP 10 and the PC 30 are connected to a network 200 and can communicate with each other via the network 200. The network 200 is a Local Area Network (LAN) or the Internet, for example. The MFP 10 is an example of an image forming device. The PC 30 is an example of the terminal.

The MFP 10 is provided with a controller 11, a memory 12, a printer 13, a scanner 14, a fax IF 15, a communication IF 16, a user IF 17, and a bus 18. The controller 11 may be a processor or a computer. The communication IF 16 may be an inter-device interface, communication member, a connection member, a data-transferring member, a data-exchange member, a connection device, or network interface. The user IF 17 may be an input interface. "IF" is an abbreviation of interface. The communication IF 16 connects the MFP 10 to the network 200 in compliance with a prescribed communication protocol. The user IF 17 is an interface between a user who directly operates the MFP 10 and the controller 11. The user IF 17 has a touchscreen 171, and physical operating keys 172. The printer 13 executes a printing operation to print images on a recording medium, such as sheets or discs. The printer 13 can employ various recording methods, such as an electrophotographic method and an inkjet method. The scanner 14 executes a scanning operation to generate image data by reading images recorded on an original. The fax IF 15 executes a fax operation to send and receive image data using a method compliant with a fax protocol. The MFP 10 may also be capable of performing compound operations that combine a plurality of operations. The copy operation in which the print operation by the printer 13 and the scanning operation by the scanner 14 are combined is an example of the compound operation.

The controller 11 includes a central processing unit (CPU), an application-specific integrated circuit (ASIC), and the like. The controller 11 controls the operations of the printer 13, the scanner 14, the fax IF 15, the communication IF 16, and the user IF 17. The memory 12 is provided with a data storage area. The data storage area is an area for storing data and the like required to execute programs and the like. The memory 12 includes a combination of RAM, ROM, a solid-state drive (SSD), a hard disk drive (HDD), and the like. The controller 11 is also provided with a buffer that may also be considered a part of the memory 12. The controller 11 uses the buffer when executing the programs.

The memory 12 may be a storage medium that the controller 11 can read. The storage medium that the controller 11 can read may be a "non-transitory medium," such as, a CD-ROM, a DVD-ROM, and etc. The non-transitory medium may be a tangible medium. On the other hand, electric signals that convey programs downloaded from a server or the like on the Internet are a computer-readable signal medium, which is one type of computer-readable medium but is not considered a non-transitory computer-readable storage medium.

The memory 12 stores firmware 20, which is a program that can be executed by the controller 11, and management information 25. The management information 25 includes information about a password for authentication (registered authentication information), information about an initial password (initial authentication information), and information about settings, described later. In the following description, actions such as "determine," "extract," "select," "calculate," "decide," "identify," "acquire," "receive," "control," and the like represent processes performed by the controller 11. Note that the term "acquire" in this specification is used as a concept that does not necessarily require a request. In other words, a process by which the controller 11 receives data without requesting that data is included in the concept of "the controller 11 acquires data." The term "data" described herein is expressed as bit strings that can be read by a computer such as the controller 11. Data of different formats are treated as the same data when the content of the data is essentially the same. The same holds true for "information" in this specification.

The firmware 20, when executed, also functions as a web server 21 that enables the PC 30 to display prescribed web pages. In other words, the MFP 10 has the built-in web server 21. Specifically, the web server 21 can provide a web page to a browser 41 (described later) on the PC 30 by transmitting data for displaying the web page to the PC 30.

Next, the configuration of the PC 30 will be described. The PC 30 is provided with a communication IF 31, a memory 32, a controller 33, a display 34, a user IF 35, and a bus 36. The components 33, 32, 31, 35, and 36 of the PC 30 have the same configurations as the controller 11, memory 12, communication IF 16, user IF 17, and bus 18 provided in the PC 30. Hence, a description of these components will not be repeated. The user IF 35 may include a keyboard or a mouse in addition to or instead of the touchscreen of the user IF.

The memory 32 stores an operating system (OS) 40 and a browser 41. The browser 41 can instruct the controller 33 to display on the display 34 an image represented by web page data received from the MFP 10.

Next, steps in a process in which the user operates the PC 30 to access the web server 21 on the MFP 10 will be described with reference to FIG. 2. First the user inputs a URL identifying the web server 21 into the browser 41 through operations on the user IF 35. In step 10 (hereinafter "step" will be abbreviated as "S"), the browser 41 transmits an HTTPS GET request that includes the inputted URL to the MFP 10. Upon receiving the GET request from the browser 41, in S11 the controller 11 returns an HTTPS response to the GET request.

Figure 3:
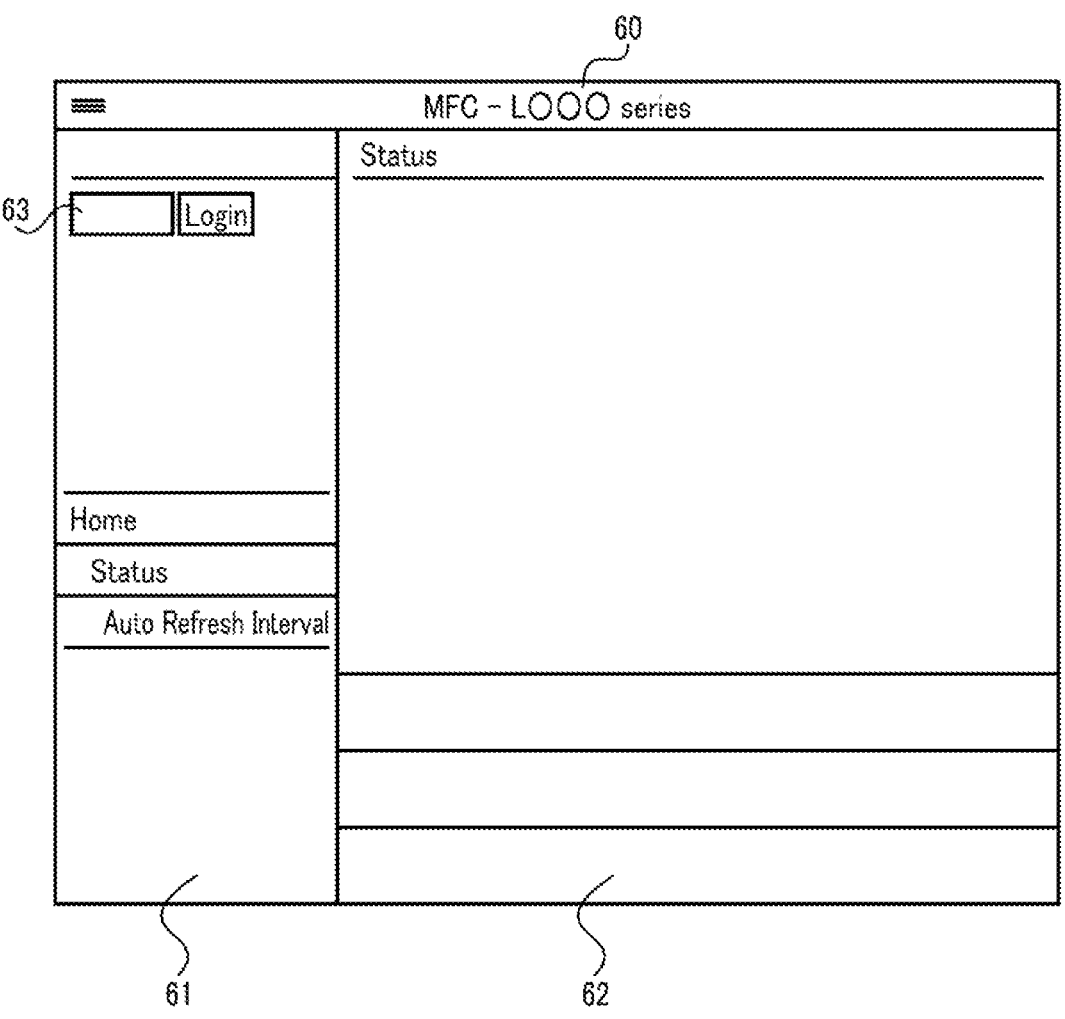
FIG. 3 is an explanatory diagram illustrating a pre-authentication home screen displayed on the personal computer in S12 shown FIG. 2.

The response returned in S11 includes web page data for displaying a pre-authentication home screen 60. Upon receiving this web page data, in S12 the browser 41 uses the web page data to display the home screen on the display 34. FIG. 3 shows an example of the pre-authentication home screen 60 displayed in S12 in the browser 41 of the PC 30. The pre-authentication home screen 60 includes an auxiliary area 61, and a main area 62. The auxiliary area 61 includes a password input field 63 that accepts entry of a login password, and options associated with various screens.

Note that rather than transmitting entire web page data to the browser 41 as a response, the controller 11 may be configured to transmit a part of web page data representing only a screen to be displayed in the main area 62 to the browser 41, and the browser 41 may be configured to change the display in the main area 62 based on this data. In this case, data representing a screen of the auxiliary area 61 may be stored in the memory 32 in advance. Alternatively, the data may be configured so that the main area 62 includes the password input field 63. The same process for transmitting data only for a main area may be employed for other screens. For example, for displaying a post-authentication home screen 70 (described later), data only for a main area 72 may be transmitted, and for displaying each of web pages related to other image forming processes having main areas, data only for a corresponding main area of the page may be transmitted.

The pre-authentication home screen 60 shown in FIG. 3 is the screen displayed prior to login authentication. The auxiliary area 61 displays the option "Home" associated with the pre-authentication home screen 60. The auxiliary area 61 also displays an option "Status" and an option "Auto-Refresh Interval" below the option "Home". Here, the option "Status" is associated with a status screen, and the option "Auto-Refresh Interval" is associated with an auto-refresh screen. The options have a hierarchical structure. In this case "Home" is one level higher than the options "Status", and "Auto-Refresh Interval".

When the user performs an operation to select one of the options in the pre-authentication home screen 60, the browser 41 transmits a GET request to the controller 11 requesting the web page associated with the selected option in a process similar to S50 (described later). Upon receiving this request from the browser 41, the controller 11 transmits a response including web page data for the requested web page to the PC 30 in a process similar to S52 described later, without executing a password authentication process described later in S51. Accordingly, the browser 41 can display a web page corresponding to the selected option on the display 34 in a process similar to S53 described later.

The status screen is a web page displaying the status of the MFP 10 in the browser 41. The auto-refresh screen is a web page that accepts an instruction for setting a refresh interval for refreshing web pages. Each of the web pages associated with these options includes both the auxiliary area 61 and the main area 62. Information displayed in the auxiliary area 61 is essentially the same for all web pages, while information displayed in the main area 62 is specific to each web page.

When the user inputs a login password into the password input field 63, in S13 the browser 41 transmits a POST request including this login password to the controller 11. Upon receiving the POST request containing the login password, in S14 the controller 11 performs an authentication process using the login password in the POST request.

Figure 4:
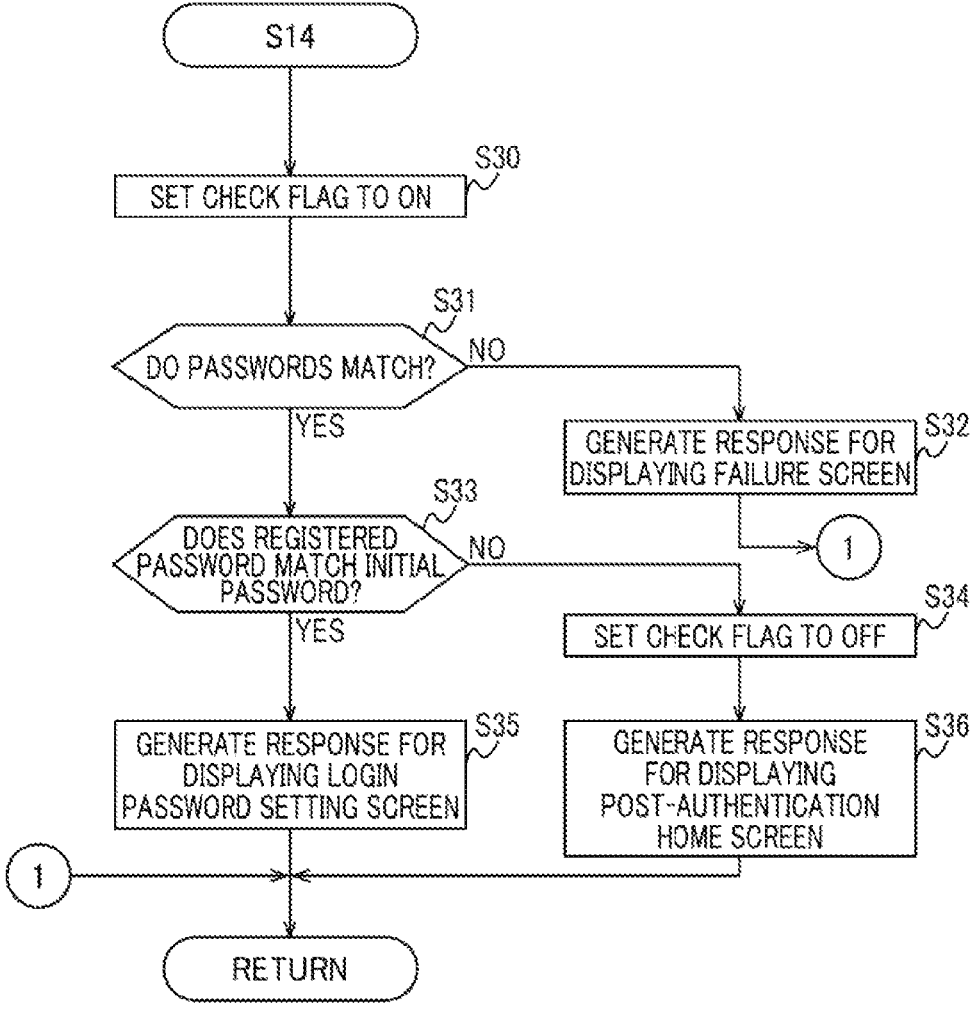
FIG. 4 is a flowchart illustrating in an authentication process executed in S14 shown in FIG. 2.

FIG. 4 is a flowchart illustrating steps in the authentication process executed in S14. In S30 of FIG. 4, the controller 11 sets a check flag to ON.

In S31 the controller 11 determines whether the inputted password contained in the POST request matches a registered login password. The management information 25 is stored in the data storage area of the memory 12. The management information 25 holds the login password as authentication information required for using the web server 21 provided in the MFP 10. Hereinafter, the login password recorded in the management information 25 as authentication information will be called the "registered password." In addition to the registered password, the management information 25 further stores an initial password. That is, the management information 25 stores the registered password and the initial password. In other words, the registered password is stored independently from the initial password. The registered password can be varied in the management information 25, but the initial password is fixedly stored in the management information 25. At the time of the shipment of the MFP 10, the registered password in the management information matches the initial password. The registered password is a current password which is referenced when use of the web server is permitted. When no value is stored as the registered password in the management information 25, the controller 11 may regard the registered password having a value matching the initial password. The registered password is an example of the current authentication information, and the initial password is an example of the initial authentication information. Alternatively, the management information 25 may not store the initial password but store the registered password as the initial password at the time of the shipment of the MFP 10. In this case, the memory 12 stores an initial password flag. At the time of the shipment of the MFP 10, the initial password flag is set to a value ON to indicate that the registered password matches the initial password. In this case, when the registered password is changed to a password different from the initial password, the initial password flag is set to a value OFF to indicate that the registered password does not match the initial password.

The state in which the check flag is ON indicates that it is undetermined (or, uncertain, unsettled) that the registered password is different (changed) from the initial password, and the state in which the check flag is OFF indicates that it is determined (or, certain, settled) that the registered password is different (changed) from the initial password. In other words, the state in which the check flag is ON may indicate that it is undetermined (or, uncertain, unsettled) that the registered password does not match the initial password, and the state in which the check flag is OFF indicates that it is determined (or, certain, settled) that the registered password does not match the initial password.

Thus, in S31 the controller 11 compares the inputted password contained in the POST request with the registered password recorded in the management information 25 and determines whether the passwords match. The controller 11 reaches a YES determination in S31 when the inputted password matches the registered password exactly. When the inputted password does not match the registered password, the controller 11 reaches a NO determination in S31. Alternatively, the controller may reach a YES determination when the inputted password partially matches the registered password. The process of S31 executed by the controller 11 is an example of the permission determination process.

When the inputted password does not match the registered password (S31: NO), the controller 11 determines that the inputted password is incorrect and advances to S32 to generate a response containing data for displaying a failure screen in the form of a web page. The failure screen includes a message indicating that authentication was unsuccessful, and an OK button. The OK button is associated with the pre-authentication home screen 60.

Figure 2:
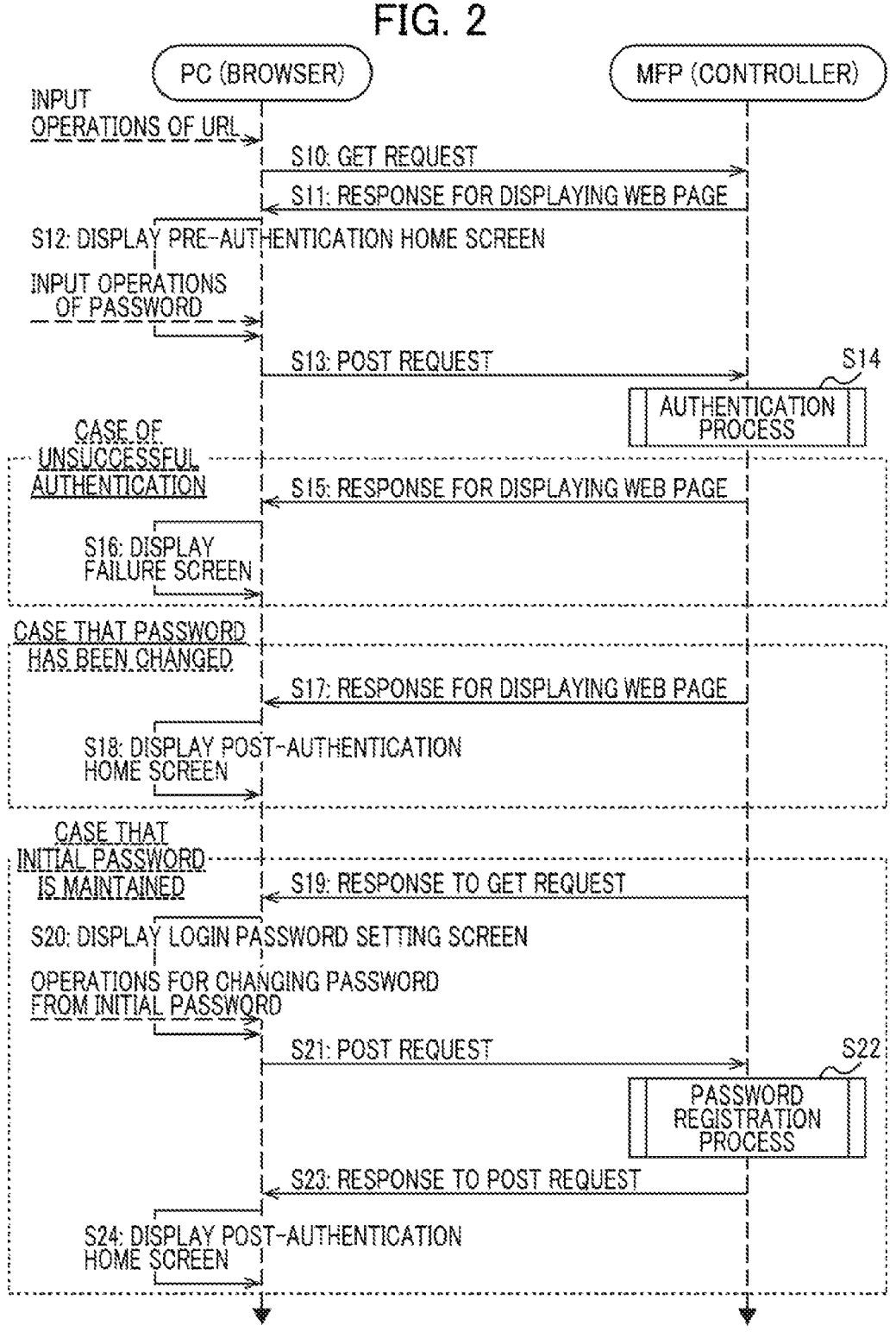
FIG. 2 is a timing chart illustrating a process executed by a personal computer and a multifunction peripheral.

After the controller 11 generates a response in S32, the process returns to FIG. 2. In this case, in S15 of FIG. 2 the controller 11 transmits the response generated in S32 to the browser 41 for displaying the failure screen. Upon receiving the response containing web page data, in S16 the browser

41 displays the failure screen on the display 34. Once the user operates the OK button in the failure screen, the browser 41 requests web page data for the pre-authentication home screen 60 from the controller 11 and displays the pre-authentication home screen 60 upon receiving the response. As an alternative, the failure screen may simply be the pre-authentication home screen 60 that includes a message indicating that authentication was unsuccessful. When the user enters a new input password into the password input field 63 of the pre-authentication home screen 60, in S13 the browser 41 sends another POST request including the new inputted password to the controller 11.

On the other hand, when the inputted password matches the registered password in S31 of FIG. 4 (S31: YES), in S33 the controller 11 determines whether the registered password matches the initial password. When the YES determination is made in S31, the controller 11 permits the use of the web server. The initial password is a default password recorded in the management information 25 when the MFP 10 is shipped from the factory or when the MFP 10 is supplied by the vendor. In other words, the initial password is a password set by someone other than the user of the PC 30.

When the registered password does not match the initial password (S33: NO), in S34 the controller 11 sets the check flag to OFF. In S36 the controller 11 generates a response corresponding to the state that authentication was successful. This response includes web page data for displaying the post-authentication home screen.

After the controller 11 generates the response in S36, the process returns to FIG. 2. In this case, in S17 of FIG. 2 the controller 11 transmits the response generated in S36 to the browser 41 for displaying the post-authentication home screen. Upon receiving this response, in S18 the browser 41 displays the post-authentication home screen on the display 34.

Figure 5:
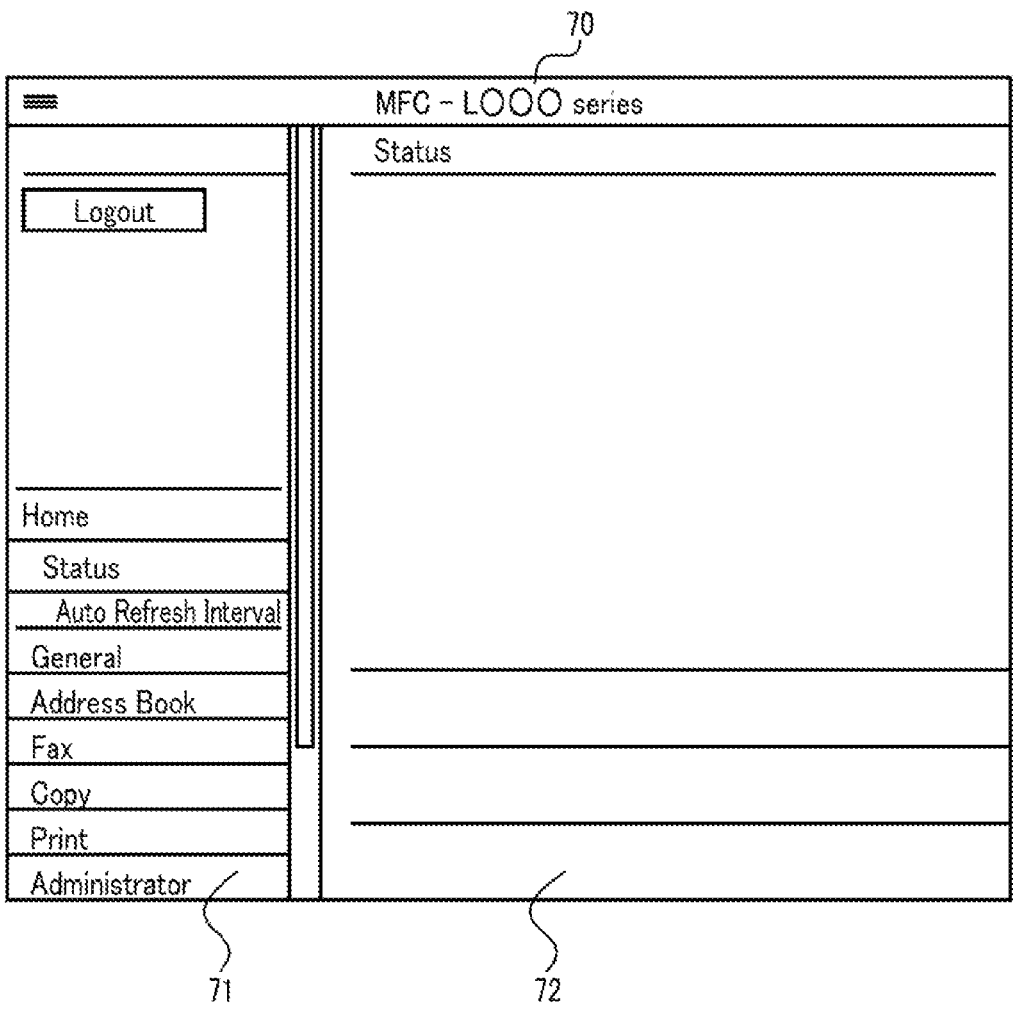
FIG. 5 is an explanatory diagram illustrating a post-authentication home screen displayed in S18 on the personal computer shown in FIG. 2.

As shown in FIG. 5, the post-authentication home screen is given the reference numeral "70" to differentiate this screen from the pre-authentication home screen 60. The post-authentication home screen 70 also has an auxiliary area 71 and a main area 72, but the auxiliary area 71 has more options than the auxiliary area 61 in the pre-authentication home screen 60, including an option "General" associated with a general settings screen, an option "Address Book" associated with an address book screen, an option "Fax" associated with a fax settings screen, an option "Copy" associated with a copy settings screen, an option "Print" associated with a print settings screen, and an option "Administrator" associated with various administrator settings screens. While not shown in FIG. 5, the auxiliary area 71 may include options for other settings screens, such as a scan settings screen.

Each screen is a web page that primarily serves to display settings and to accept operations for modifying those settings. When the controller 11 receives a request from the browser 41 indicating an instruction to change a setting in response to a user-operation in a displayed screen, the controller 11 changes the setting value in the management information 25 according to the received request.

The general settings screen is mainly used to display and change settings not limited to specific image formation functions, such as clock settings for the PC 30. The address book screen is used to display and change information in an address book. The address book screen includes information on a plurality of addresses used by the scanning function and fax function. The fax settings screen, the copy settings screen, the print settings screen, and the scan settings screen are used to display and change settings related to corresponding image formation functions such as the fax function, the copy function, the print function, and the scan function. The fax settings screen, the copy settings screen, the print settings screen, and the scan settings screen may also be used for receiving operations instructing the execution of a fax transmission, a copy, a print, and a scan, respectively.

When the controller 11 receives a request with specifying (or, including) an execution instruction in response to a user-operation in a web page, the controller 11 executes the image forming process according to the received request. Settings included in the management information 25 are used for executing image forming operations. The requests specifying an execution instruction may be POST requests.

The administrator settings screen is a screen used for displaying and changing settings for the administrator of the PC 30. While not shown in the drawings, an option "Login Password" associated with a login password setting screen, an option "Restriction Management" associated with a function restriction settings screen, an option "Solutions" associated with a solution settings screen, and an option associated with network settings screens are listed hierarchically under the "Administrator" string. The login password setting screen will be described later.

The function restriction settings screen is used to display and change the user ID and settings associated with the user ID. Each of these settings is related to a function whose use is permitted or restricted. Or, these settings may include settings indicating whether use of the function is permitted or restricted, for each function. The solution settings screen is used to display and change settings for a solutions function. The solutions function serves to execute prints or scans according to instruction data acquired from an external server. The network settings screen is used to display and change settings used for network communications performed when printing, scanning, and the like.

In the present embodiment, the post-authentication home screen 70 is an example of the operation reception page. Each Web page that the browser 41 displays upon an operation to select an option included in the auxiliary area 71 of the post-authentication home screen 70 is an example of the operation execution screen.

On the other hand, when the controller 11 determines in FIG. 4 that the inputted password matches the registered password (S31: YES) and determines that the registered password matches the initial password (S33: YES), in S35 the controller 11 generates a response that includes web page data for displaying the login password setting screen.

After the controller 11 generates a response in S35, the process returns to FIG. 2. In this case, in S19 of FIG. 2 the controller 11 transmits the response generated in S35 to the browser 41 for displaying the login password setting screen. Upon receiving this response, in S20 the browser 41 displays a login password setting screen 80 on the display 34.

Figure 6:
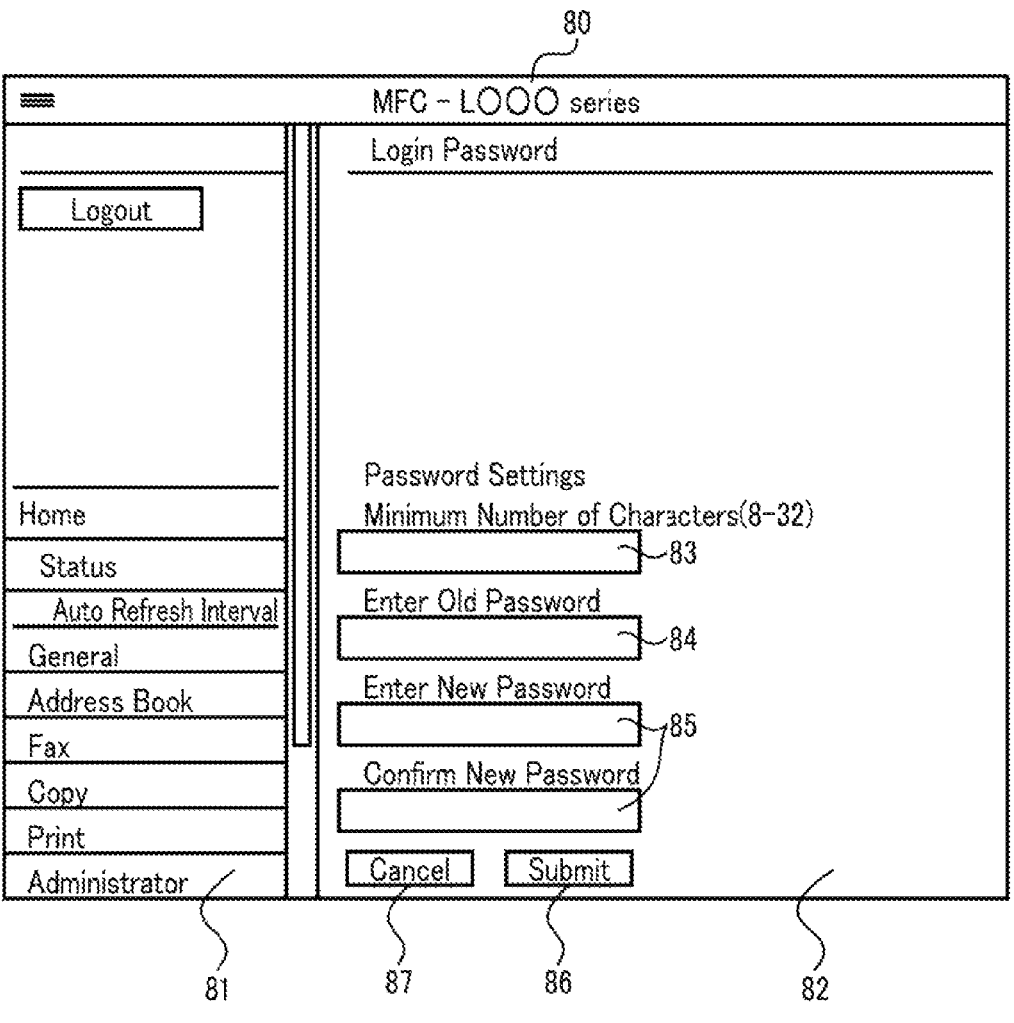
FIG. 6 is an explanatory diagram illustrating a login password setting screen displayed on the personal computer in S20 shown in FIG. 2.

FIG. 6 shows an example of the login password setting screen 80. The login password setting screen 80 has a main area 82 that displays entry fields accepting input to change the login password. The login password setting screen 80 also displays an auxiliary area 81 that is essentially the same as the auxiliary area 71 in the post-authentication home screen 70.

As shown in FIG. 6, the main area 82 of the login password setting screen 80 includes an entry field 83 that accepts input for the minimum number of characters in the password, an entry field 84 that accepts input of the current login password, entry fields 85 that accept input of the new login password, a Submit icon 86, and a Cancel icon 87. The management information 25 stores the minimum number of characters. The minimum number of characters is automatically read from the management information 25 and included in the response generated in S35 so that the current minimum number of characters is automatically entered and displayed in the entry field 83 when displaying the login password setting screen 80. Because the minimum number of characters displayed in the entry field 83 can be changed by the user's input operation, in S44 (described later), the controller 11 records (updates) the minimum number of characters inputted into the entry field 83 in the management information 25. The controller 11 may update the minimum number of characters in the management information 25 to a value inputted in to the entry field 83 only when the user inputs the new minimum number of characters in the entry field 83, or may update the minimum number of characters regardless of whether or not the minimum number of characters in the entry field 83 is changed by the user. Alternatively, the controller 11 may record the minimum number of characters inputted into the entry field 83 in the management information 25 just prior to S40 described later.

The auxiliary area 81 in the login password setting screen 80 also includes options that accept operations to select other screens. When any one of the options are selected, the controller 11 may display a screen in the main area 82 including the fields 83-85 and icons 86 and 87 to receive and transmit the minimum number of characters, the current login password, and the new login password. When the Cancel icon 87 is operated in the login password setting screen 80, the browser 41 transmits a GET request, which is a request for web page data used to display the post-authentication home screen 70, without executing the process in S21 described later, and the controller 11 transmits a response to the browser 41 that includes the web page data for displaying the post-authentication home screen 70.

On the other hand, when the Submit icon 86 is operated, in S21 (FIG. 2) the browser 41 transmits a POST request to the controller 11 that includes the information inputted into the entry fields 83, 84, and 85 of the login password setting screen 80. In other words, when a new login password has been inputted into the entry fields 85, the browser 41 includes the new login password in this POST request. Upon receiving the POST request, in S22 the controller 11 executes a password registration process.

Figure 7:
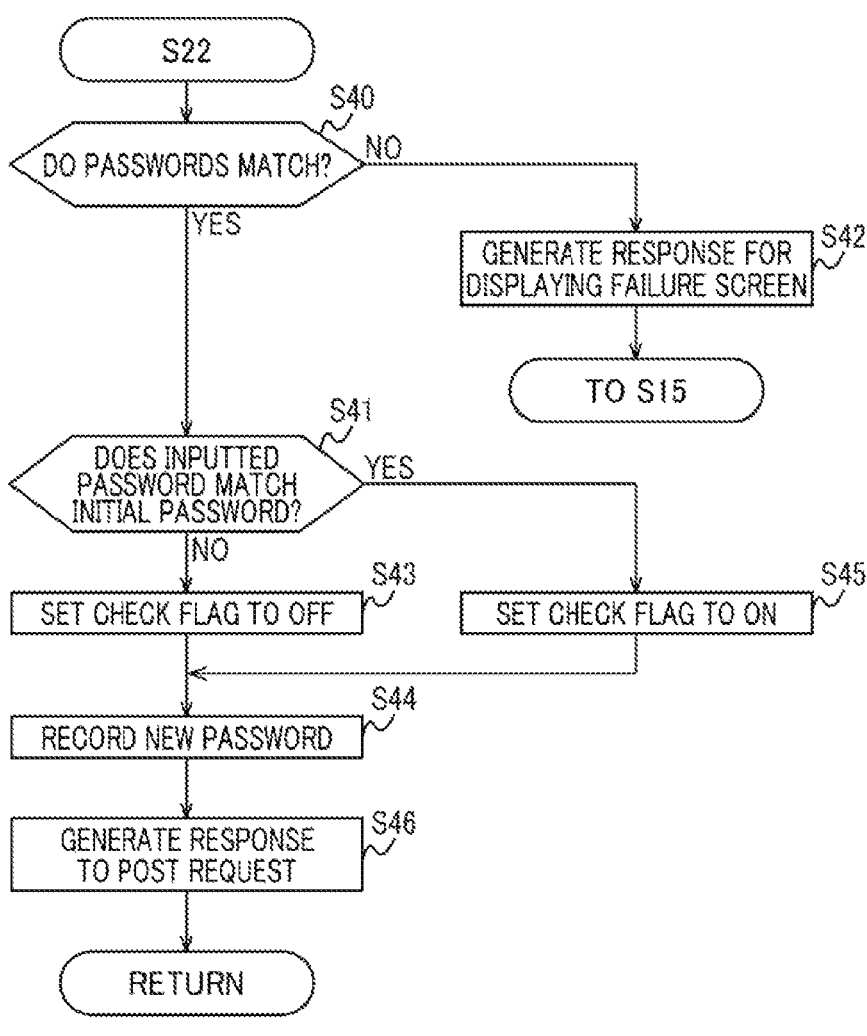
FIG. 7 is a flowchart illustrating a password registration process executed in S22 shown in FIG. 2.

FIG. 7 is a flowchart illustrating steps in the password registration process of S22. In S40 of FIG. 7, the controller 11 makes three determination processes as described below. That is, the controller 11 determines whether the two new passwords inputted into the entry fields 85 in the login password setting screen 80 match. Further, the controller 11 also determines whether the password inputted into the entry field 84 matches the registered password and whether the number of characters in the new password inputted into the entry fields 85 is at least the minimum number of characters inputted into the entry field 83. When the controller 11 reaches YES determinations for all three determinations, the controller advances to S41. However, when the controller 11 reaches at least one NO determination among the three determinations, the controller advances to S42.

In S42 the controller 11 generates a response for displaying a failure screen similarly to S32 described above. This failure screen may include information depending on the results of three determinations made in S40. That is, the failure screen may include information indicating that a new password cannot be registered in the browser 41 and/or information indicating the reason why the new password cannot be registered. For example, the reason may be that two new passwords inputted into the entry fields 85 does not match, that the password inputted into the entry field 84 does not match the registered password, and/or that the number of characters in the new password inputted in the entry field 85 is less than the minimum number. These reasons may be selected on the basis of the results of three determinations made in S40. After the controller 11 completes the process of S42, a transmission process and a display process similar to the processes of S15 and S16 of FIG. 2 are performed. That is, the controller 11 transmits the response generated in S42, and thereafter the browser 41 displays the failure screen based on the received response.

Alternatively, the browser 41 may be configured to perform a process similar to S40 for determining whether the two new passwords inputted into the entry fields 85 match and the process for determining whether the number of characters in the new passwords inputted into the entry fields 85 is at least the minimum number of characters inputted into the entry field 83 prior to transmitting the POST request in S21 and to transmit the POST request in S21 only when a YES determination is reached in all two determination processes. In this case, in S40 the controller 11 may perform only a process to determine whether the password inputted into the entry field 84 matches the registered password.

In S41 the controller 11 determines whether the password inputted into the entry fields 85 matches the initial password. When the password inputted into the entry fields 85 matches the initial password (S41: YES), in S45 the controller 11 sets the check flag to ON.

Following the process in S45, in S44 the controller 11 records the new password inputted, as the current password, into the login password setting screen 80 in the management information 25. In other words, the controller 11 updates the current password registered in the management information 25 using the inputted password according to the POST request received in S21. Further, in S44 the controller 11 also records (updates) the minimum number of characters inputted into the entry field 83 in the management information 25. In S46 the controller 11 generates a response to the POST request for displaying the post-authentication home screen 70. After the controller 11 generates a response in S46, the process returns to FIG. 2. In S23 of FIG. 2, the controller 11 transmits the response generated in S46 to the browser 41. Upon receiving a response to the POST request, in S24 the browser 41 displays the post-authentication home screen 70. In other words, when the initial password is re-entered into the login password setting screen 80 in the present embodiment, the browser 41 displays the post-authentication home screen 70 while the check flag set to ON in S45 remains ON.

However, when the new password inputted into the login password setting screen 80 is not the initial password (S41: NO), in S43 the controller 11 sets the check flag to OFF and advances to S44 described above.

In this case, in S23 of FIG. 2 the controller 11 transmits the response generated in S46 for displaying the post-authentication home screen 70 to the browser 41. In S24 the browser 41 displays the post-authentication home screen 70. Hence, when the registered password has been modified in the login password setting screen 80 to a password different from the initial password, the post-authentication home screen 70 is displayed while the check flag is set to OFF.

Figure 8:
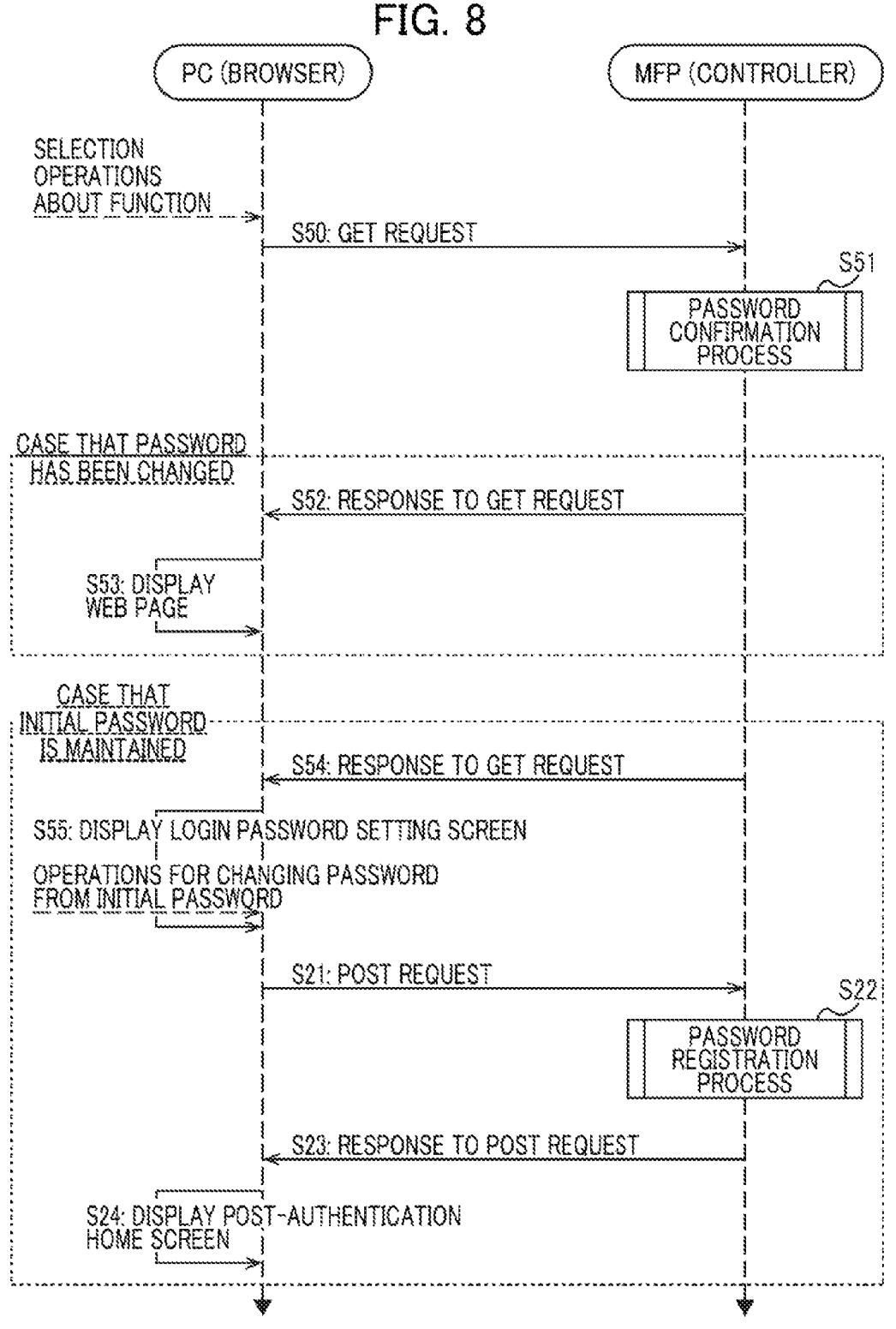
FIG. 8 is a timing chart illustrating a process executed by the personal computer and the multifunction peripheral.

Next, processes executed by the browser 41 and the controller 11 following a successful authentication will be described. The process shown in FIG. 8 is executed in a case that the browser 41 receives a selection operation for an option in the auxiliary area 71 of the post-authentication home screen 70 (FIG. 5) displayed on the PC 30 after the controller 11 determined in the authentication process of S14 that the inputted password matches the registered login password (S31: YES), i.e., while the inputted password has been authenticated. However, this process may also be executed when the browser 41 receives a selection operation for an option in the pre-authentication home screen 60 (FIG. 3).

As in the pre-authentication home screen 60, when the user performs an operation to select an option in the post-authentication home screen 70, in S50 the browser 41 transmits a GET request in the form of a request for the web page associated with the selected option. The following description illustrates, as an example, a case that the option associated with the solution settings screen was selected.

Upon receiving a GET request for an option in the post-authentication home screen 70, in S51 the controller 11 executes a password confirmation process. Note that when a POST request is received in the present embodiment, the controller 11 simply generates a response to the POST request and transmits this response to the PC 30 without executing the process of S51.

Figure 9:
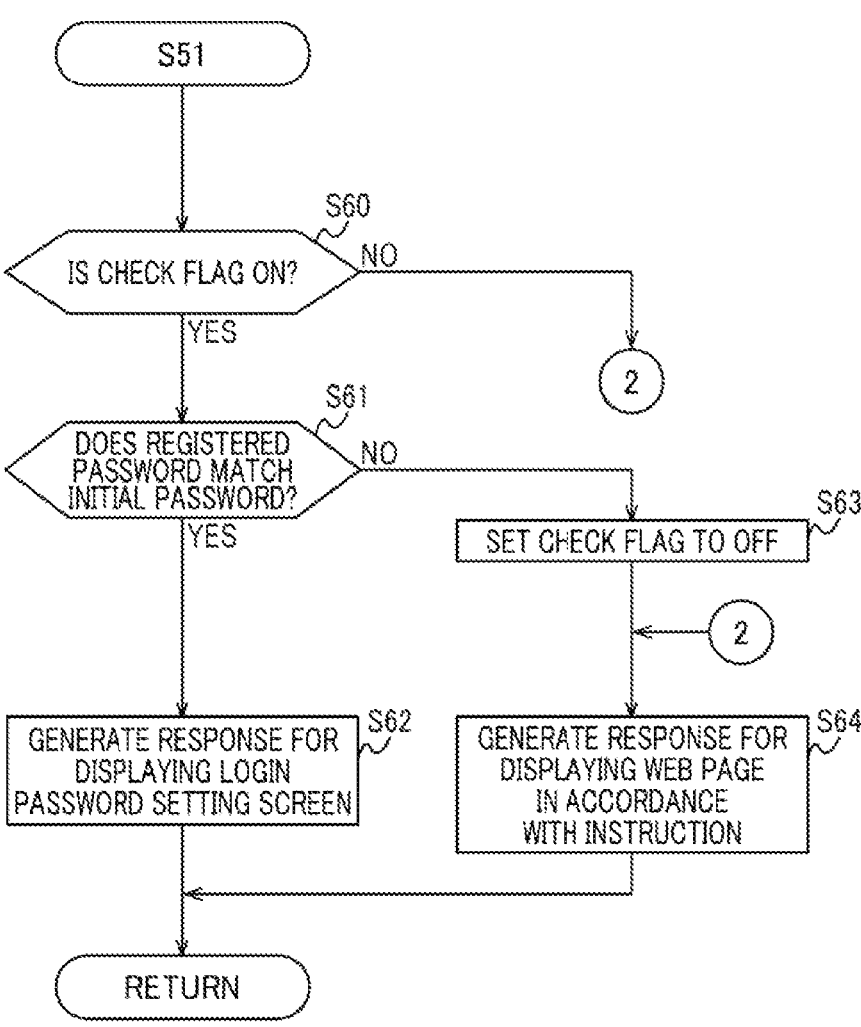
FIG. 9 is a flowchart illustrating a process of S51 shown in FIG. 8.

FIG. 9 is a flowchart showing steps in the process of S51 executed by the controller 11. In S60 of FIG. 9, the controller 11 determines whether the check flag is set to ON. When the check flag is set to OFF (S60: NO), the controller 11 advances to S64 described later.

When the check flag is set to ON (S60: YES), in S61 the controller 11 determines whether the registered password matches the initial password. For example, in a case that the registered password matched the initial password when the authentication process was performed in S14 and the registered password was not changed to a password different from the initial password in the password registration process of S22, then the controller 11 reaches a YES determination in S61 and advances to S62. The process of S60 may not be performed. In this case, in a case that the registered password was changed to a password other than the initial password in the password registration process of S22, regardless of whether the registered password was determined to be the initial password in the authentication process of S14, the controller 11 reaches a NO determination in S61 and advances to S63.

In other words, when the check flag is set to ON in the present embodiment, the controller 11 checks whether the registered password matches the initial password. However, when the check flag is set to OFF, the controller 11 does not check whether the registered password matches the initial password. Thus, the process in the present embodiment is designed to avoid excessively checking whether the registered password matches the initial password. The check flag is an example of the confirmation information. The state in which the check flag is OFF is an example of the first state and the state in which the check flag is ON is an example of the second state. That is, the value OFF in the check flag is an example of the first value and the value ON in the check flag is an example of the second value.

In S63 the controller 11 sets the check flag to OFF. In S64 the controller 11 generates a response for displaying the web page in accordance with an instruction in the GET request received in S50 from the browser 41. Since the option for the solution settings screen was selected in the post-authentication home screen 70 in this example, the controller 11 generates a response that includes data for displaying the web page for the solution settings screen.

After the controller 11 generates the response in S64, the process returns to FIG. 8. In S52 of FIG. 8, the controller 11 transmits the response generated in S64 to the browser 41. Upon receiving the response from the controller 11, in S53 the browser 41 displays a web page on the display 34 based on the data included in the response.

Figure 10:
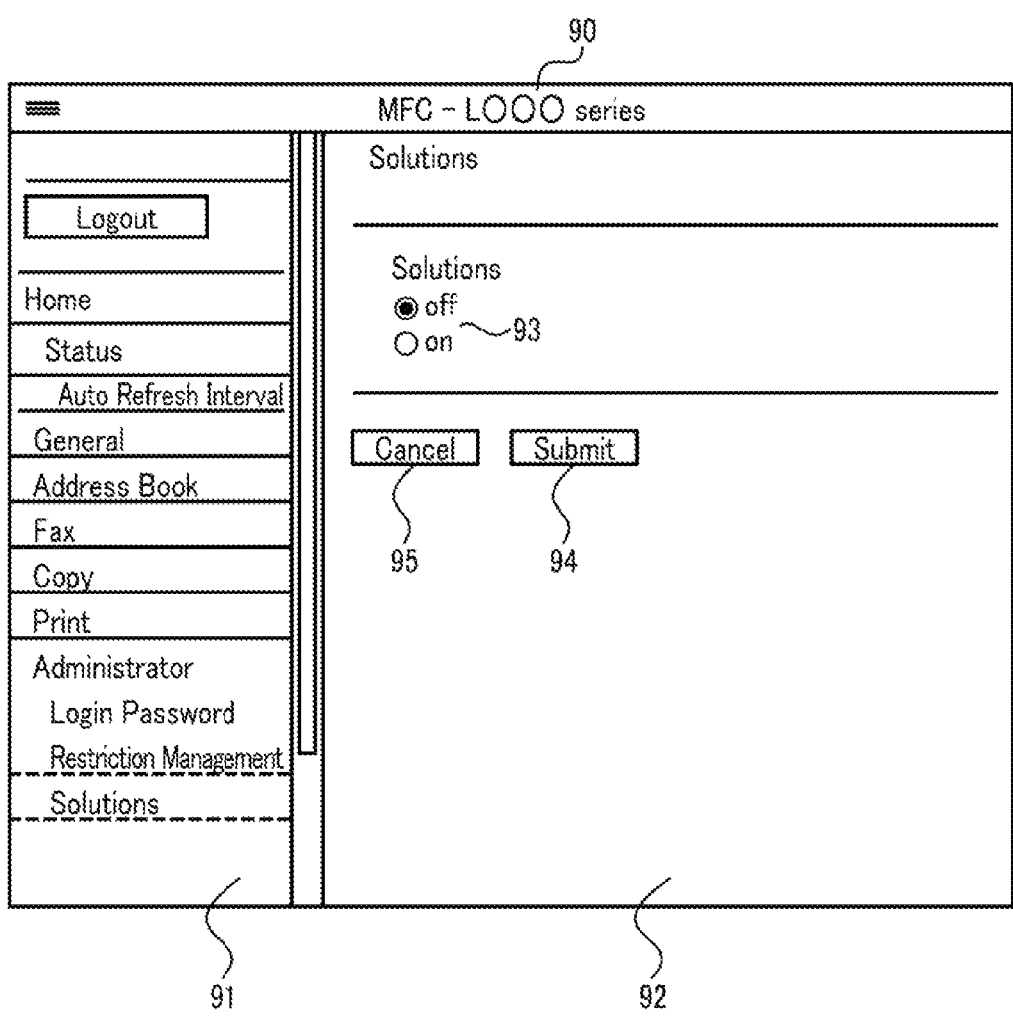
FIG. 10 is an explanatory diagram illustrating a solution settings screen displayed on the personal computer in S53 shown in FIG. 8.

In this example, a solution settings screen 90 such as that shown in FIG. 10 is displayed as the web page. The solution settings screen 90 has an auxiliary area 91, and a main area 92. The main area 92 includes radio buttons 93 for selecting either an ON or OFF value for executing the solutions function, a Submit icon 94 for confirming the execution selection, and a Cancel button 95 for canceling the selection. The auxiliary area 91 of the solution settings screen 90 includes options associated with screens for the various image forming processes. Here, the terms "icons" and "buttons" are used to indicate images enabling accepting of selection operations by the user, and the two terms are essentially the same.

When the user operates the Submit icon 94 in the solution settings screen 90 displayed on the browser 41, the browser 41 transmits a POST request containing the setting selected via the radio buttons 93 to the controller 11, and the controller 11 records the setting in the management information 25 on the basis of the POST request.

Note that regardless of whether the option selected in the post-authentication home screen 70 or the solution settings screen 90 is associated with the print settings screen, the copy settings screen, or the fax settings screen, in S50 the browser 41 transmits a GET request to the controller 11 for displaying the screen associated with the selected option. In any case, in the password confirmation process of S51 (FIG. 9), in S61 the controller 11 determines whether the registered password matches the initial password when the check flag is set to ON (S60: YES). When the registered password does not match the initial password (S61: NO), in S64 the controller 11 generates a response to the GET request.

Next, a case will be described in which the registered password is maintained to match the initial password. When in the authentication process of S14 shown in FIG. 4 the inputted password was authenticated (S31: YES) but the registered password remains to match the initial password (S33: YES), the login password setting screen 80 shown in FIG. 6 is displayed in the browser 41 (S35, S19, S20). At this time, in a case that the Cancel icon 87 was operated in the login password setting screen 80 or in a case that the Submit icon 86 was operated after the initial password was re-entered into the entry fields 85, the registered password remains the initial password.

In this case, since the registered password matches the initial password in FIG. 9 (S61: YES), in S62 the controller 11 generates a response for displaying the login password setting screen 80. The response generated in S62 for displaying the login password setting screen 80 on the browser 41 is identical to the response generated in S35 of FIG. 4.

Figure 11:
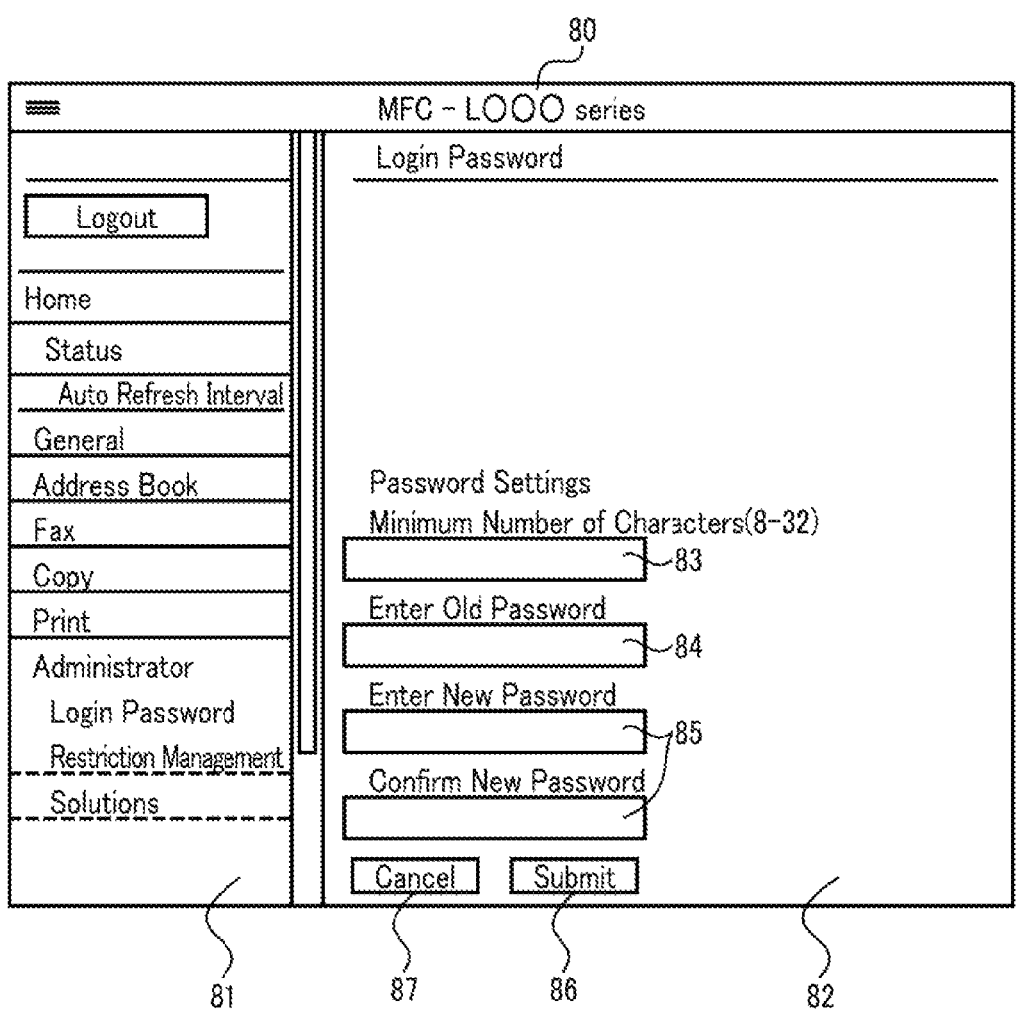
FIG. 11 is an explanatory diagram illustrating a login password setting screen displayed on the personal computer in S55 shown in FIG. 8.

After the controller 11 generates the response in S62, the process returns to FIG. 8. In S54 of FIG. 8, the controller 11 transmits the response generated in S62 to the browser 41. Upon receiving this response, in S55 the browser 41 displays the login password setting screen 80 on the display 34 as shown in FIG. 11. This login password setting screen 80 displayed in S55 is basically identical to the screen (FIG. 6) displayed in S20. However, since the option for the solution settings screen was selected in the post-authentication home screen 70 in this example, the option for the solution settings screen displayed in a selected state in the auxiliary area 81, as shown in FIG. 11.

Processes performed by the browser 41 and the controller 11 in response to operations in the login password setting screen 80 (FIG. 11) displayed in S55 are identical to the processes (S21-S24 of FIG. 2) based on operations in the login password setting screen 80 (FIG. 6) displayed in S20.

The embodiment described above can obtain the following effects.

The controller 11 provided in the MFP 10 allows the PC 30 to access the web server 21 using an inputted password and a registered password. When the registered password matches the initial password, the controller 11 transmits web page data for displaying the login password setting screen 80 to the PC 30 for receiving an instruction to change the registered password to be different from the initial password. When the controller 11 receives an instruction to change the registered password to be different from the initial password through operations in the login password setting screen 80, the controller 11 records the new password in the management information 25. Thus, the controller 11 can encourage a user to modify the registered password to be different from the initial password on the MFP 10 having the built-in web server 21, thereby improving the security of the MFP 10.

After the controller 11 permits the user access to the web server 21 through an authentication process using a login password that the user inputted in the pre-authentication home screen 60, the controller 11 transmits web page data for the post-authentication home screen 70 to the PC 30. When the controller 11 receives an instruction in response to operations in the post-authentication home screen 70, the controller 11 provides a web page to the PC 30 according to the operations performed via the post-authentication home screen 70, provided that the registered password is different from the initial password. When an instruction for an image forming process is received via this web page, the controller 11 executes a process based on the received instruction.

When the registered password matches the initial password, the controller 11 transmits data to the PC 30 for displaying the login password setting screen 80 (FIG. 11). In this way, the controller 11 can prompt the user to change the registered password to be different from the initial password at a time that the user is performing an operation related to the MFP 10 following successful authentication of the password.

When an inputted password received via the pre-authentication home screen 60 matches the registered password but the registered password matches the initial password, the controller 11 transmits web page data to the PC 30 for displaying the login password setting screen 80. In this way, the controller 11 can prompt the user to change the registered password to be different from the initial password on occasions that a password is entered.

Once authentication has been completed successfully, the controller 11 can determine whether to perform a check operation related to the registration password in a manner depending on the ON/OFF value indicated by the check flag. Here, the check operation is to check if the registered password matches the initial password. Accordingly, the controller 11 can avoid unnecessarily performing the process to check if the registered password matches the initial password.

Variations of the Embodiment

In the embodiment described above, the controller 11 determines whether the registered password matches the initial password when executing the authentication process in S14 (FIG. 2) using the login password and when executing the password authentication process in S51 (FIG. 8) in response to a request for a web page related to one of the functions in the post-authentication home screen 70. As an alternative, the controller 11 may not determine whether the registered password match the initial password in the authentication process of S14, but may determine in S51 whether the registered password match the initial password when receiving a request to display a web page related to one of the options in the post-authentication home screen 70. In this case, as in the process shown in FIG. 9, when the controller 11 determines that the registered password match the initial password (S61: YES), in S62 the controller 11 generates a response for displaying the login password setting screen 80 in the browser 41.

When the controller 11 determines in the authentication process of S14 (FIG. 4) that the registered password matches the initial password (S33: YES), in S35 the controller 11 may generate a response containing web page data for a status screen that includes the same entry fields 83-85 and icons 86 and 87 provided in the login password setting screen 80 as well as information about the status of the MFP 10. In this case, the user may change the registered password to one different from the initial password through the status screen displayed in the browser 41, for example. That is, in this case, the status screen is an example of the password changing screen. Similarly, when the controller 11 determines that the registered password matches the initial password in the process of S61 performed in response to an operation in the post-authentication home screen 70 (FIG. 5) (S61: YES), the controller 11 may display the status screen including the same entry fields 83-85 and icons 86 and 87 rather than or in addition to displaying a web page for the function that was selected in the post-authentication home screen 70. Similarly, when the controller 11 determines that the registered password matches the initial password in the process of S41 performed in response to an operation in the login password setting screen 80 (FIG. 6) (S41: YES), the controller 11 may display the status screen including the same entry fields 83-85 and icons 86 and 87 rather than or in addition to displaying a web page for the post-authentication home screen 70.

In the embodiment described above, the controller 11 transmits web page data for displaying the pre-authentication home screen 60 (FIG. 3) to the PC 30, enabling the browser 41 to display the pre-authentication home screen 60 that includes the password input field 63. As an alternative, the PC 30 may store data in the memory 32 in advance for displaying the pre-authentication home screen 60 with the password input field 63, and the browser 41 may display the pre-authentication home screen 60 using this data stored in the memory 32. In this case, when the user selects an option in the auxiliary area 61 of the pre-authentication home screen 60, the browser 41 may send a request for web page data associated with the selected option to the controller 11.

The state in which the check flag is ON indicates that it is undetermined (or, uncertain, unsettled) that the registered password is different (changed) from the initial password in the embodiment. Thus, when the check flag is ON in S60 (FIG. 9) (S60: YES), in S61 the controller 11 checks whether the registered password matches the initial password. However, the state in which the check flag is OFF may indicate that it is undetermined (or, uncertain, unsettled) that the registered password is different (changed) from the initial password, and the state in which the check flag is ON may indicate that it is determined (or, certain, settled) that the registered password is different (changed) from the initial password. In this case, when the check flag is OFF in S60, in S61 the controller 11 checks whether the registered password matches the initial password. In this case, when the check flag is ON in S60, the controller 11 advances to the process of S64. In this case, the state in which the check flag is ON is an example of the first state and the state in which the check flag is OFF is an example of the second state. In the embodiment, the controller 11 sets the check flag to OFF in S30 of FIGS. 4 and S45 of FIG. 7 and to ON in S34 of FIG. 4, S43 of FIG. 7, and S63 of FIG. 9.

As an alternative, the state in which a check flag is stored in the memory 12 may indicate that it is undetermined (or, uncertain, unsettled) that the registered password is different (changed) from the initial password, and the state in which no check flag is stored in the memory may indicate that it is determined (or, certain, settled) that the registered password is different (changed) from the initial password. In this case, the controller 11 determines in S60 of FIG. 9 whether a check flag is stored in the memory 12. When a check flag is stored in the memory 12 (S60: YES), in S61 the controller 11 may check whether the registered password matches the initial password. In this case, the state in which no check flag is stored in the memory 12 is an example of the first state and the state in which the check flag is stored in the memory 12 is an example of the second state. In this case, a check flag is stored in the memory 12 in S30 and S45 and is deleted from the memory 12 in S34, S43, and S63.

OTHER EMBODIMENTS

The image forming device is not limited to the embodiment described above but may be modified in various ways without departing from the spirit of the invention. Other information in addition to the login password, such as the name of the logged-in user and identification information of the user, may be used as authentication information, provided that this information can be used to individually determine whether to permit access to the web server.

The MFP 10 is employed as an example of the image forming device. However, the image forming device may be a printer, a scanner, or a copier machine.

What is claimed is:

1. An image forming device comprising:
   a memory;
   a communication interface; and
   a computer configured to function as a web server that enables the communication interface to communicate with a browser running on a terminal, the computer being configured to further perform:
   receiving authentication information inputted to the terminal;
   determining, on the basis of the inputted authentication information and current authentication information, whether to permit use of the web server by the terminal;
   in a case that the use of the web server has been permitted, determining whether the current authentication information matches initial authentication information,
   in a case where it is determined that the current authentication information does not match the initial authentication information and the use of the web server by the terminal has been permitted:
   transmitting, as the web server, data for displaying a specific web page to the terminal, the specific web page being for receiving an operation to issue a first instruction related to an image forming process;
   receiving the first instruction from the terminal; and in response to receiving the first instruction, a process according to the first instruction; and in a case that it is determined that the current authentication information matches the initial authentication information and the use of the web server by the terminal has been permitted:

transmitting, to the terminal, data for displaying an authentication changing web page, the authentication changing web page being for receiving new authentication information to issue a second instruction to update the current authentication information using the new authentication information;

receiving the second instruction from the terminal; and in response to receiving the second instruction, updating the current authentication information in the memory using the new authentication information according to the second instruction, wherein regardless of whether an authentication information update process has been executed for the current authentication information, in a case that the current authentication information matches the initial authentication information and the use of the web server by the terminal has been permitted, an instruction related to the image forming process is not accepted by the computer from the terminal.

2. The image forming device according to claim 1, wherein the computer is configured to further perform:

transmitting, to the terminal, data for displaying an authentication receiving web page, the authentication receiving web page being for receiving the inputted authentication information; and permitting the use of the web server by the terminal when the inputted authentication information received via the authentication receiving web page matches the current authentication information, after the use of the web server by the terminal has been permitted, transmitting, to the terminal, data for displaying an operation receiving web page, the operation receiving web page being for receiving an operation to issue a third instruction;

receiving the third instruction from the terminal;

in a case that the third instruction has been received from the terminal and it is determined that the current authentication information does not match the initial authentication information:

transmitting, to the terminal, data for displaying a receiving web page based on the third instruction, the receiving web page being for receiving an operation to issue a fourth instruction related to an image forming process;

receiving the fourth instruction from the terminal; and performing a process according to the fourth instruction; and in a case that the third instruction has been received from the terminal and it is determined that the current authentication information matches the initial authentication information:

transmitting the data for displaying the authentication changing web page.

3. The image forming device according to claim 2, wherein the operation receiving web page is for receiving a selection operation selecting one of a plurality of execution operation receiving web pages, each of the plurality of execution operation receiving web pages being associated with a corresponding image forming process and being for receiving an operation related to the corresponding image forming process, wherein the computer is configured to further perform:

receiving information about the selection operation from the terminal;

in a case that the information about the selection operation has been received and it is determined that the current authentication information does not match the initial authentication information, transmitting, to the terminal, data for displaying the selected one of the plurality of execution operation receiving web pages; and in a case that the information about the selection operation has been received and it is determined that the current authentication information matches the initial authentication information, transmitting, to the terminal, the data for displaying the authentication changing web page.

4. The image forming device according to claim 1, wherein the computer is configured to further perform:

in response to an instruction from the terminal, transmitting, to the terminal, data for displaying an authentication receiving web page, the authentication receiving web page being for receiving the inputted authentication information, wherein the inputted authentication information is received using the authentication receiving web page; and wherein in a case that the received inputted authentication information matches the current authentication information and it is determined that the current authentication information matches the initial authentication information, the transmitting the data for displaying the authentication changing web page is performed.

5. The image forming device according to claim 1, wherein the determining whether the current authentication information matches initial authentication information comprises comparing the current authentication information with the initial authentication information to determine whether the current authentication information matches the initial authentication information;

wherein the computer is configured to further perform:

in a case that the inputted authentication information matches the current authentication information and the current authentication information does not match the initial authentication information, setting a determination value stored in the memory to a first value or maintaining the determination value at the first value, the first value indicating that it has been determined that the current authentication information is different from the initial authentication information;

in a case that the inputted authentication information matches the current authentication information and the current authentication information matches the initial authentication information, setting the determination value to a second value, or maintaining the determination value at the second value, the second value indicating that it has been undetermined that the current authentication information is different from the initial authentication information;

after the use of the web server by the terminal has been permitted, transmitting, to the terminal, data to display an operation receiving web page to receive an operation to issue a third instruction;

receiving the third instruction from the terminal;

in a case that the third instruction has been received and the determination value is set to the first value:

performing a process according to the third instruction; and in a case that the third instruction has been received and the determination value is set to the second value:

comparing the current authentication information with the inputted authentication information to determine whether the current authentication information matches the initial authentication information;

when the current authentication information does not match the initial authentication information, performing the process according to the third instruction and setting the determination value to the first value or maintaining the determination value at the first value; and when the current authentication information matches the initial authentication information, transmitting, to the terminal, the data for displaying the authentication changing web page while maintaining the determination value at the second value.

6. The image forming device according to claim 1, wherein the image forming process is one of a process to print an image and a process to form image data by reading an original.

7. The image forming device according to claim 1, wherein the authentication information is a password.

8. The image forming device according to claim 1, wherein the initial authentication information is default authentication information.

9. The image forming device according to claim 1, wherein the memory is configured to store the initial authentication information and the current authentication information.

10. The image forming device according to claim 1, wherein the memory is configured to store a determination value and the determining whether the current authentication information matches initial authentication information is based on the determination value.

11. An image forming device comprising:

a memory;

a communication interface; and a computer configured to function as a web server that enables the communication interface to communicate with a browser running on a terminal, the computer being configured to further perform:

receiving authentication information inputted to the terminal;

determining, on the basis of the inputted authentication information and current authentication information, whether to permit use of the web server by the terminal;

in a case that the use of the web server by the terminal has been permitted, transmitting, as the web server, data for displaying an operation receiving web page to the terminal, the operation receiving web page being for receiving an operation to issue a first instruction to perform a function related to an image forming process;

receiving the first instruction from the terminal; and in response to receiving the first instruction, determining whether the current authentication information matches initial authentication information;

in a case that it is determined that the current authentication information does not match the initial authentication information, performing the function related to the image forming process in accordance with the first instruction received; and in a case that it is determined that the current authentication information matches the initial authentication information, transmitting, to the terminal, data for displaying an authentication changing web page, the authentication changing web page being for receiving new authentication information to issue a second instruction to update the current authentication information using the new authentication information;

receiving the second instruction from the terminal; and in response to receiving the second instruction, updating the current authentication information in the memory using the new authentication information according to the second instruction, wherein regardless of whether an authentication information update process has been executed for the current authentication information, in a case that the current authentication information matches the initial authentication information and the use of the web server by the terminal has been permitted, an instruction related to the image forming process is not accepted by the computer from the terminal.

12. The image forming device according to claim 11, wherein the computer is configured to further perform:

transmitting, to the terminal, data for displaying an authentication receiving web page, the authentication receiving web page being for receiving the inputted authentication information, where the use of the web server by the terminal is permitted when the inputted authentication information received via the authentication receiving web page has matched the current authentication information;

after the use of the web server by the terminal has been permitted, the first instruction is received and it is determined that the current authentication information does not match the initial authentication information:

transmitting, to the terminal, data for displaying a receiving web page based on the first instruction, the receiving web page being for receiving an operation to issue a third instruction related to the image forming process;

receiving the third instruction from the terminal; and performing a process according to the third instruction.

13. The image forming device according to claim 12, wherein the operation receiving web page is for receiving a selection operation selecting one of a plurality of execution operation receiving web pages, each of the plurality of execution operation receiving web pages being associated with a corresponding image forming process and being for receiving an operation related to the corresponding image forming process, wherein the computer is configured to further perform:

receiving information about the selection operation from the terminal;

in a case that the information about the selection operation has been received and it is determined that the current authentication information does not match the initial authentication information, transmitting, to the terminal, data for displaying the selected one of the plurality of execution operation receiving web pages; and in a case that the information about the selection operation has been received and it is determined that the current authentication information matches the initial authentication information, transmitting, to the terminal, the data for displaying the authentication changing web page.

14. The image forming device according to claim 11, wherein the computer is configured to further perform:

receiving an instruction from the terminal to transmit data for displaying an authentication receiving web page, the authentication receiving web page being for receiving the inputted authentication information; and transmitting the data for displaying the authentication receiving web page, wherein the inputted authentication information is received by using the authentication receiving web page, and wherein in a case that the received inputted authentication information matches the current authentication information and it is determined that the current authentication information matches the initial authentication information, the transmitting the data for displaying the authentication changing web page is performed.

15. The image forming device according to claim 11, wherein the determining whether the current authentication information matches initial authentication information comprises:

comparing the current authentication information with the initial authentication information to determine whether the current authentication information matches the initial authentication information;

wherein the computer is configured to further perform:

in a case that the inputted authentication information matches the current authentication information and the current authentication information does not match the initial authentication information, setting a determination value stored in the memory to a first value or maintaining the determination value at the first value, the first value indicating that it has been determined that the current authentication information is different from the initial authentication information;

in a case that the inputted authentication information matches the current authentication information and the current authentication information matches the initial authentication information, setting the determination value to a second value or maintaining the determination value at the second value, the second value indicating that it has been undetermined that the current authentication information is different from the initial authentication information, in a case that the first instruction has been received, and the determination value is set to the first value:

performing the function according to the first instruction; and in a case that the first instruction has been received, and the determination value is set to the second value:

comparing the current authentication information with the inputted authentication information to determine whether the current authentication information matches the initial authentication information;

when the current authentication information does not match the initial authentication information, performing the function according to the first instruction and setting the determination value to the first value or maintaining the determination value at the first value; and when the current authentication information matches the initial authentication information, transmitting, to the terminal, the data for displaying the authentication changing web page while maintaining the determination value at the second value.

16. The image forming device according to claim 11, wherein the image forming process is one of a process to print an image and a process to form image data by reading an original.

17. The image forming device according to claim 11, wherein the authentication information is a password.

18. The image forming device according to claim 11, wherein the initial authentication information is default authentication information.

19. The image forming device according to claim 11, wherein the memory is configured to store the initial authentication information and the current authentication information.

20. The image forming device according to claim 11, wherein the memory is configured to store a determination value and the determining whether the current authentication information matches initial authentication information is based on the determination value.

* * * * *